United States Patent [19]

Maeda et al.

[11] Patent Number: 4,682,989
[45] Date of Patent: Jul. 28, 1987

[54] METHOD OF RECOVERING VOLATILE FOAMING AGENT FROM PREFOAMED BEADS OF POLYOLEFIN RESINS

[75] Inventors: Hirofumi Maeda, Takatsuki, Japan; Naruhiko Akamatsu, Berchem, Belgium

[73] Assignee: Kanegafuchi Kagaku Kogyo Kabushiki Kaisha, Osaka, Japan

[21] Appl. No.: 789,672

[22] Filed: Oct. 21, 1985

[30] Foreign Application Priority Data

Oct. 23, 1984 [JP] Japan .............................. 59-222524

[51] Int. Cl.⁴ ............................................. B01D 53/14
[52] U.S. Cl. ............................................. 55/23; 55/74; 264/37; 264/53; 264/DIG. 9; 521/56; 521/60
[58] Field of Search ............. 521/56, 60; 264/37, 264/53, DIG. 9; 55/23, 74

[56] References Cited

U.S. PATENT DOCUMENTS

| | | | |
|---|---|---|---|
| 2,838,801 | 6/1958 | De Long et al. | 264/37 |
| 3,607,999 | 9/1971 | Corbett et al. | 264/37 |
| 3,859,404 | 1/1975 | Immel et al. | 264/37 |
| 3,883,624 | 5/1975 | McKenzie et al. | 264/37 |
| 4,065,532 | 12/1977 | Wild et al. | 264/37 |
| 4,379,859 | 4/1983 | Hirosawa et al. | 521/59 |
| 4,394,333 | 7/1983 | Fukushima et al. | 264/523 |
| 4,399,089 | 8/1983 | Akiyama et al. | 521/53 |
| 4,415,680 | 11/1983 | Ushirokawa et al. | 521/56 |
| 4,531,951 | 7/1985 | Burt et al. | 264/37 |

Primary Examiner—Morton Foelak
Attorney, Agent, or Firm—Armstrong, Nikaido, Marmelstein & Kubovcik

[57] ABSTRACT

The present invention provides a method of recovering volatile foaming agent contained in prefoamed beads of polyolefin resin characterized in that the volatile foaming agent contained in the prefoamed beads is recovered by bringing into contact with heated air prefoamed beads obtained by heating polyolefin resin beads containing the volatile foaming agent. According to the invented method it is possible to avoid not only aggravation of the working environments and atmospheric pollution but also risk of explosion etc. and, furthermore, material cost can be saved through reutilization of the recovered volatile foaming agent.

4 Claims, 1 Drawing Figure

METHOD OF RECOVERING VOLATILE FOAMING AGENT FROM PREFOAMED BEADS OF POLYOLEFIN RESINS

FIELD OF THE INVENTION

The present invention relates to a method of recovering volatile foaming agent from prefoamed beads of polyolefin resins and more particularly to a method of recovering the volatile foaming agent remaining in the prefoamed beads after prefoaming in the process of manufacturing preforamed beads of polyolefins.

DESCRIPTION OF THE PRIOR ART

Prefoaming method of polyolefin resins has been disclosed in (1) Japanese Laid Open Patent Application No. 155675/1977, (2) West German Laid Open Patent Application No. 2,107,683, (3) Japanese Patent Publication No. 1344/1981 etc. The method described in (1) consists in that crosslinked polyolefin resin beads containing a volatile foaming agent (physical foaming agent 45°-70° C. in boiling temperature) are heated under pressure in a pressure container for prefoaming, while both (2) and (3) consist in that thermoplastic resin beads containing volatile foaming agent are dispersed in water in a pressure container such as autoclave, stirred at a high temperature and under a high pressure and then let out into a zone of low pressure to prefoam the thermoplastic resin beads.

In these methods, however, no reference is made to the volatile foaming agent which is vaporized into the atmosphere from the resulting prefoamed beads, and as it is, it is allowed to be released into the atmosphere.

Release of such volatile foaming agent not only causes such serious problems as aggravation of working environments and air pollution, but also economic loss such as rising of the material cost.

SUMMARY OF THE INVENTION

It is a primary object of the present invention to provide a method of recovering the volatile foaming agent remaining in the prefoamed beads after preliminary foaming.

Another object of the present invention is to prevent releasing of the volatile foaming agent from the prefoamed beads into the atmosphere to ensure against aggravation of working environments, the risk of explosion etc.

Still another object of the present invention is to lower the material cost through effective recovery and reutilization of volatile foaming agent remaining in the prefoamed beads.

These and further objects as well as advantages of the present invention will become apparent from the following detailed description.

DETAILED DESCRIPTION OF THE INVENTION

Figure 1:
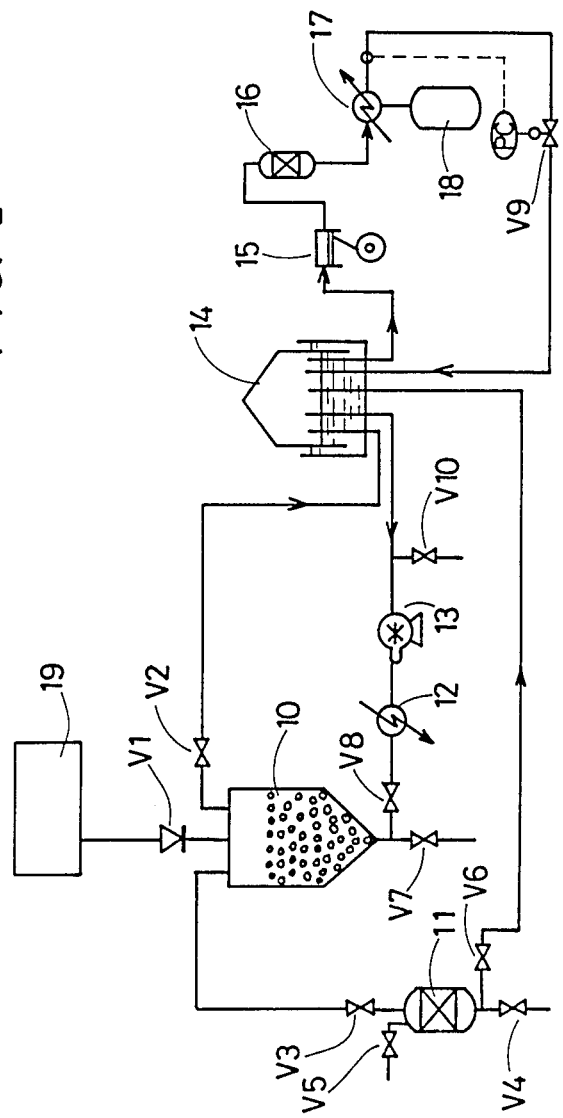
FIG. 1 is an outline view showing an example of the apparatus used for execution of the present invention.

The present invention relates to a method of recovering volatile foaming agent from prefoamed beads of polyolefin resins characterized in that recovery of the volatile foaming agent contained in the prefoamed beads through contact with hot air of the prefoamed beads obtained through heating the polyolefin resin beads containing the volatile foaming agent.

As polyolefin resins used in connection with the present invention are low density polyethylene, medium density polyethylene, high density polyethylene, polypropylene, ethylene-propylene copolymer, ethylene-vinyl acetate copolymer, ethylene-methylmethacrylate copolymer etc. and such polymers may be used either alone or in combination. These resins may be used as they are but it is also possible to use them crosslinked by the use of peroxide, radioactive ray or the like.

According to the present invention, polyolefin resins are used after being made into beads. Such beads are made by suspension polymerization, pelletization by extruder, calender roll or the like, or smashing sheet, bar or the like. The shape of the bead is not particularly limited such as spherical, oval, cylindrical, cubic or rectangular parallelepiped, but for uniformity in foamed bead size, it is always desirable to be as uniform as possible. The bead size is preferred to be within 0.5-6 mm.

As volatile foaming agent according to the present invention may be cited hydrocarbons, halogenized hydrocarbons etc. ranging $-50°-100°$ C. in boiling point such as propane, butane, pentane, hexane, heptane, cyclopentane, cyclohexane, monochloromethane, dichloromethane, monochloroethane, trichloromonofluoromethane, dichlorodifluoromethane, dichlorotrifluoroethane and dichlorotetrafluoroethane, these being usable either alone or in combination.

As method for impregnating the beads of polyolefin resins with the volatile foaming agent for subsequent prefoaming under heating in the method of the present invention there is, for instance, a method of pressurizing and heating the resin beads and the foaming agent in a pressure container to have the latter to be impregnated in the former, taking out the resulting foaming agent-impregnated resin beads and put them into another pressure container provided with a mixer and a means for blowing steam in for heating and prefoaming, a method of dispersing the resin beads and the foaming agent in water in a pressure container and then, with the latter impregnated in the former under elevated pressure and temperature, then opening a part of the bottom of the pressure container to release the mixture of foaming agent-impregnated resin beads and water into atmosphere of normal pressure, or the like.

In this case the kind and quantity of the volatile foaming agent contained in the resin beads are dependent upon the kind of the polyolefin resin beads and the desired expansion ratio and quality of prefoamed beads, and the proper dosage of the volatile foaming agent is 2-50 weight parts. When the dose is less than 2 weight parts, the economical significance of recovery becomes less, while when it should be more than 50 weight parts, it exceeds the limit for resin beads to merely result in rise of pressure to thus become wasteful economically.

The foaming agent-containing polyolefin resin in bead form of the present invention is extremely rapid in releasing gas, hence when it is allowed to lie in the atmosphere for 24 hours at room temperature after prefoaming, the volatile foaming agent remaining in the aforesaid prefoamed beads are totally released to the atmosphere. Hence, it is desirable that the prefoamed beads are introduced into the foaming agent recovery device before the foaming agent escapes into the atmosphere, and it is advisable to connect the preforming chamber with the foaming agent recovery device with a pipe or the like.

The foaming agent recovery device is basically made up of a device for extracting foaming agent from the prefoamed beads, hot air circulating device, gas holder, ordinary liquid recovery device and activated carbon adsorption tank.

Here, particularly important is the temperature of the hot circulating air. If it is too high, the prefoamed beads tend to contract to result in decrease of the magnification factor of the prefoamed beads. Meanwhile, when it is too low, it takes too much time to replace the foaming agent in the prefoamed beads with air and results in poor productivity.

The setting of hot air temperature may be done properly according to the properties of the basic resin, kind of foaming agent, expansion ratio etc. but it is required to be at least less than the temperature at which the prefoamed beads begin to contract, and preferably be not greater than resin's Vicat softening point minus 10° C. Since, as mentioned above, it takes too long time to recover the foaming agent if the hot air temperature should be too low, this being uneconomical, the preferred temperature is at least $-15°$ C. The preferred temperature is, for example, 10°-60° C. for linear low density PE (LL-DPE), 10°-85° C. for closslinked PE and 30°-100° C. for ethylene propylene random copolymer.

The volatile foaming agent having escaped to the hot air from the prefoamed beads in the aforesaid storage tank may be guided to an ordinary refining, separating and catching device to be reused as foaming agent or be liquefied by compressor etc. for storage. As the above-mentioned device may be used e.g. a condenser for compressing for cooling/liquefying gaseous foaming agent.

The volatile foaming agent still remaining in the foaming agent extraction vessel or pipeline is recoverable to a considerable extent by adsorption by e.g. active carbon.

After all, through combination of such methods it is possible to reduce the amount of foaming agent escaping into the atmosphere from the prefoamed beads containing volatile foaming agent led into the foaming agent extracting vessel to be less than 5% of the total amount of foaming agent. By this, the escape of foaming agent which not only causes air pollution and aggravation of the working environments but also brings about rise of the material's cost can be largely prevented.

According to the appending drawings showing a preferred embodiment of the present invention, FIG. 1 shows a schematic view of essential parts of a recovery device of the present invention, reference numeral 10 designates a foaming agent extracting vessel for extracting the foaming agent from the prefoamed beads into air, 11 an active carbon adsorbing tower, 12 a heat exchanger for heating the circulating air, 13 a circulating blower, 14 a gas holder, 15 a gas compressor for recovery under liquefaction, 16 a dehumidifier for eliminating water from the gas, 17 a condenser in which the compressed foaming agent is condensed and 18 a tank for recovery of the liquefied foaming agent. Between individual components are, as illustrated, provided valves V1-V9.

Described below is a method of recovering the foaming agent from the prefoamed beads by the use of the equipment shown in FIG. 1, wherein first the gas vessel of the top lid of gas holder 14 is lowered so that there is scarcely any gas in the holder, and then refrigerant is flowed to the condenser 17 and it is then cooled to the predetermined temperature. Then the foaming agent extraction vessel 10 is filled with air of atmospheric pressure and the valves V3, V7 and V8 are closed. And thereafter the prefoamed beads containing foaming agent are sent from the prefoaming chamber 19 through open V1 to the foaming agent extracting vessel 10. Then the air in the foaming agent extracting vessel 10 is pressed out to the gas holder 14 by the prefoamed beads. As method of supplying the prefoamed beads, they may be supplied directly from a pressure container as shown in Laid Open Patent Application No. 197027/1983, or may as well be supplied through a low pressure container. When the supply of the prefoamed beads is over, V1 is closed, V8 is opened, circulation blower 13 and heat exchanger for heating 12 are started for pre-heating the air dwelling in the gas holder 14 and sending it into the foaming agent extracting vessel 10 and then back into the gas holder 14.

By this operation the foaming agent in the prefoamed beads is shifted into the circulating air lower in concentration. Meanwhile, part of the circulating air is shifted by difference in concentration into the prefoamed beads. Thus the circulating air returns from the foaming agent extracting vessel 10 with its foaming agent concentration higher than when it entered it. Simultaneously with extraction of the foaming agent the liquefaction recovery system by compression is actuated, the gas inside the gas holder 14 is compressed by the compressor 15 and, after eliminating water in the gas by adsorbent such as silica gel in the dehumidifier tower 16, liquefied by the condenser 17 and stored in the recovery tank 18 as recovered foaming agent. The gas with its foaming gas content reduced, is pressure controlled by V9 to be sent back to the gas holder 14. By thus causing air to contact with the prefoamed beads the foaming agent in the prefoamed beads is recovered and, with simultaneous in-flow of air into the prefoamed beads, the foaming agent is replaced with air with the contraction of the prefoamed beads being controlled. As recovery thus proceeds for a given length of time, the foaming agent's concentration in the air flowing out of the gas holder 14 into the compressor 15 and that in the air flowing back from the condenser 17 to the gas holder 14 become equal for further recovery under liquefaction to become infeasible. Then the foaming agent's concentration in the prefoamed beads is roughly equal to that in the circulating air. Although a considerable amount of foaming agent is recovered by this operation, V1, V2, V7, V10, V5 and V6 are to be closed when further recovery of foaming agents remaining in the gas phase of the foaming agent extracting vessel 10 and in the gas holder 14 and V3 and V4 are to be opened for the air and foaming agent in the gas holder to be sent into the active carbon adsorbing tower 11 by the circulation blower 13 and air scarcely containing foaming agent is then let out into the atmosphere through V4. When the air and foaming agent in the gas holder 14 are used up, V10 is to be opened to suck in air from the atmosphere for the foaming agent in the foaming agent extracting vessel 10 to be chased out into the active carbon adsorption tower 11, at the same time the foaming agent remaining in the beads are extracted by means of the difference in concentration to be subsequently sent to the active carbon adsorption tower 11. The foaming agent thus adsorbed by active carbon are desorbed by steaming from V5 with V3 and V4 closed and V5 and V6 opened, and the foaming agent is transferred to the gas holder 14 for recovery under liquefaction.

The prefoamed beads after recovery of foaming agent is to be taken out of the foaming agent extracting vessel 10 by opening V7.

Hereinafter described in greater details are examples of the present invention, but, need not to say, the present invention is not limited thereby or thereto.

EXAMPLE 1

| | |
|---|---|
| Prefoamed beads: | 25 kg |
| Ethylene-propylene random copolymer (density = 0.9 g/cm$^3$, MI = 9.0, ethylene content = 4.5 wt%, Vicat softening point = 119° C.) pellets foamed to a true density of 0.03 g/cm$^3$ (30 folds) | |
| Foaming agent in prefoamed beads: Dichlorodifluoromethane | 4 kg |

The above prefoamed beads were subjected to foaming agent recovery treatment by the use of the equipment shown in FIG. 1.

In the figure, the capacity of the foaming agent extracting vessel was 1.6 m$^3$, that of the gas holder 1 m$^3$ and performances of gas compressor 95 lr/min., 7 kg/cm$^2$G (Gauge), oilless type, circulation blower 1.6 m$^3$/min. and as active carbon adsoption tower was used Cargon Inc.'s BPL charged with 4 kg of active carbon.

The treating conditions were as follows.

| | |
|---|---|
| Circulating air temp.: | 15° C., 60° C., 100° C., 120° C., |
| Air circulation rate: | 1.5 m$^3$/min. |
| Gas compressor operation condition: | 7 kg/cm$^2$G, 50 lr/min. |
| Condenser temperature: | −70° C. |

The recovery time when the recovery is made under the above conditions is shown in Table 1 below together with the relationship between the foaming agent recovery percentage and the volume of prefoamed beads.

TABLE 1

| | Circulation air temperature (°C.) | | | | | | | |
|---|---|---|---|---|---|---|---|---|
| | 15 | | 60 | | 100 | | 120 | |
| Time (Hr.) | F.A. rec. % | Beads vol. % | F.A. rec. % | Beads vol. % | F.A. rec. % | Beads vol. % | F.A. rec. % | Beads vol. % |
| 0 | 0 | 100 | 0 | 100 | 0 | 100 | 0 | 100 |
| 1 | 20 | — | 96 | — | 96 | 97 | 96 | 95 |
| 2 | 30 | 99 | 96 | 98 | 96 | 96 | 96 | 94 |
| 3 | 40 | — | — | — | — | — | — | — |
| 4 | 48 | 99 | — | 98 | — | — | — | — |
| 10 | 70 | — | — | — | — | — | — | 90 |
| 24 | 80 | 99 | — | 98 | — | 98 | — | 85 |

Note: F.A. rec. = Foaming agent recovery

Then in the above example, after 1 hour of treatment at the circulating air temperature of 60° C., the gas in the gas holder was blown into the active carbon adsorption tower by the blower, further air of 60° C. was sent to the foaming agent extracting vessel at a rate of 1.5 m$^3$/min., dichlorodifluoromethane in the gas phase of the vessel and dichlorodifluromethane contained in the preformed beads were chased out to be adsorbed by the active carbon. After one hour of adsorption water vapor is blown in for desorption of dichlorodifluoromethane and the recovery rate of dichlorodifluoromethane under liquefaction was 99.5% in total. Recovery of foaming agent resulted in contraction of the prefoamed beads by 2% in volume.

EXAMPLE 2

| | |
|---|---|
| Prefoamed beads: | 25 kg |
| Straight-chain low density polyethylene (density = 0.92 g/cm$^3$, MI = 0.8, Vicat softening point = 97° C.) pellets foamed to a true density of 0.0368 g/cm$^3$ (25 folds) | |
| Foaming agent in prefoamed beads: Dichlorodifluoromethane | 5.5 kg |

The above prefoamed beads were subjected to recovery treatment using the same equipment as in the example 1.

The treating conditions were as follows.

| | |
|---|---|
| Circulating air temp.: | 23° C., 60° C., 80° C., 90° C. |
| Air circulation rate: | 1.5 m$^3$/min. |
| Gas compressor operation condition: | 7 kg/cm$^2$G, 50 lr/min. |
| Condenser temperature: | −70° C. |

The recovery time when recovery is made under the above conditions is shown in Table 2 below together with the relationship between the foaming agent recovery percentage and the volume of prefoamed beads.

TABLE 2

| | Circulation air temperature (°C.) | | | | | | | |
|---|---|---|---|---|---|---|---|---|
| | 15 | | 60 | | 100 | | 120 | |
| Time (Hr.) | F.A. rec. % | Beads vol. % | F.A. rec. % | Beads vol. % | F.A. rec. % | Beads vol. % | F.A. rec. % | Beads vol. % |
| 0 | 0 | 100 | 0 | 100 | 0 | 100 | 0 | 100 |
| 1 | — | 88 | 95 | 76 | 95 | 75 | 95 | 63 |
| 2 | 60 | 78 | 95 | 67 | 95 | 56 | 95 | 45 |
| 3 | — | 72 | — | 67 | — | — | — | 43 |
| 4 | 72 | 66 | — | 70 | — | — | — | 48 |
| 10 | 82 | 78 | — | 75 | — | 68 | — | 52 |
| 24 | 95 | 86 | — | 76 | — | 70 | — | 54 |

In the Table 2 there is noted a tendency that the beads having once contracted reexpand in the lapse of time, but this is because the gas permeability of straight chain low-density polyethylene is dichlorodifluormethane>air.

Then in the above example after treatment for 3 hours at a circulating air temperature of 23° C. the gas in the gas holder and the gas in the foaming agent extracting vessel were sent to the active carbon adsorption tower and then 1.5 m$^3$/min. of air was sent in one hour from the foaming agent extracting vessel to the active carbon adsorption tower. Dichlorodifluoromethane adsorbed to the active carbon was desorbed by means of water vapor and recovered under liquefaction. The recovery rate for dichlorodifluoromethane was 97.5%. And this process resulted in 20% reduction of the volume of prefoamed beads.

As mentioned above, release to the atmosphere of foaming agent which causes contamination of the atmosphere, aggravation of the working environments and rise of material cost can be substantially prevented by the present invention in which the volatile foaming agent remaining in the polyolefin prefoamed beads immediately after prefoaming is brought into contact with heated air in a closed container to enhance vaporization of the foaming agent from the prefoamed beads and recovering the same thereafter.

What is claimed is:

1. A method of recovering a volatile foaming agent from prefoamed beads of polyolefin resin, which comprises heating polyolefin resin beads containing a volatile foaming agent, thereby obtaining prefoamed beads; contacting said prefoamed beads with circulating heated air; causing the volatile foaming agent contained in the prefoamed beads to escape into the circulating heated air, while suppressing the contraction of the prefoamed beads, and recovering said volatile foaming agent from said circulating heated air by liquefaction.

2. A recovery method as recited in claim 1 wherein the temperature of said heated air is not greater than polyolefin resin's Vicat softening temperature minus 10° C.

3. A recovery method as recited in claim 1, wherein said recovery includes condensing said volatile foaming agent.

4. The recovery method of claim 1 wherein the system of recovering the volatile foaming agent by liquefaction is a circulating system.

* * * * *